United States Patent
Ma et al.

(10) Patent No.: US 12,209,855 B2
(45) Date of Patent: Jan. 28, 2025

(54) PROJECTION APPARATUS, COLLECTION APPARATUS, AND THREE-DIMENSIONAL SCANNING SYSTEM WITH SAME

(71) Applicant: SHINING3D TECHNOLOGY CO., LTD., Zhejiang (CN)

(72) Inventors: Chao Ma, Zhejiang (CN); Zi Ye, Zhejiang (CN)

(73) Assignee: SHINING3D TECHNOLOGY CO., LTD., Zhejiang (CN)

( * ) Notice: Subject to any disclaimer, the term of this patent is extended or adjusted under 35 U.S.C. 154(b) by 898 days.

(21) Appl. No.: 17/294,686

(22) PCT Filed: Nov. 19, 2019

(86) PCT No.: PCT/CN2019/119446
§ 371 (c)(1),
(2) Date: May 18, 2021

(87) PCT Pub. No.: WO2020/103822
PCT Pub. Date: May 28, 2020

(65) Prior Publication Data
US 2022/0003541 A1    Jan. 6, 2022

(30) Foreign Application Priority Data
Nov. 19, 2018  (CN) .......................... 201811378663.1

(51) Int. Cl.
*G01B 11/25*    (2006.01)
(52) U.S. Cl.
CPC ...... *G01B 11/2509* (2013.01); *G01B 11/2518* (2013.01)
(58) Field of Classification Search
CPC ... G01B 11/25; G01B 11/2509; G01B 11/254; G01B 11/2518; G03B 21/14–53
See application file for complete search history.

(56) References Cited

U.S. PATENT DOCUMENTS 6,438,272 B1 * 8/2002 Huang .................. G06T 1/0007
  356/4.09
6,754,370 B1 * 6/2004 Hall-Holt ............... G01B 11/25
  356/3

(Continued)

FOREIGN PATENT DOCUMENTS

CN    1426527 A    6/2003
CN    101127923 A    2/2008
(Continued)

OTHER PUBLICATIONS

The Second office action of family AU application No. 2019382644 issue on Mar. 6, 2023.
(Continued)

*Primary Examiner* — Bao-Luan Q Le
(74) *Attorney, Agent, or Firm* — Samson G. Yu

(57) ABSTRACT

The present application discloses a projection apparatus, a collection apparatus, and a three-dimensional scanning system with the same. The projection apparatus includes: a light emission portion, configured to emit multiple rays of preset light, wherein the multiple rays of preset light correspond to multiple preset wavebands, and the multiple preset wavebands are different from each other; and a light transmission portion, disposed on a transmission path of the rays of preset light, wherein the rays of preset light is transmitted via a preset pattern on the light transmission portion to generate target light projected to a target object in the form of color-coded fringes, and the light transmission portion transmits the rays of preset light corresponding to at least two different preset wavebands.

18 Claims, 4 Drawing Sheets

(56) References Cited

U.S. PATENT DOCUMENTS

| | | | |
|---|---|---|---|
| 6,788,210 B1* | 9/2004 | Huang | G06T 17/10 340/612 |
| 8,908,277 B2 | 12/2014 | Pesach et al. | |
| 10,386,177 B1 | 8/2019 | Ng | |
| 2003/0016366 A1* | 1/2003 | Takeda | G01B 11/2513 356/604 |
| 2005/0035314 A1* | 2/2005 | Yamaguchi | G01B 11/2545 250/559.38 |
| 2005/0287489 A1 | 12/2005 | Odanaka et al. | |
| 2007/0206204 A1* | 9/2007 | Jia | G01B 11/2527 356/604 |
| 2008/0117438 A1* | 5/2008 | Quirion | G01B 11/2509 356/610 |
| 2010/0092040 A1* | 4/2010 | Fischer | G01B 11/25 382/106 |
| 2010/0188400 A1* | 7/2010 | Chen | G01B 11/2509 345/591 |
| 2010/0284589 A1* | 11/2010 | Thiel | A61C 9/006 348/66 |
| 2010/0311005 A1 | 12/2010 | Liang | |
| 2011/0050859 A1* | 3/2011 | Kimmel | G01B 11/2509 382/106 |
| 2012/0092461 A1* | 4/2012 | Fisker | G01B 11/2513 348/46 |
| 2012/0229816 A1* | 9/2012 | Rodrigue | G01B 11/25 356/610 |
| 2013/0016136 A1* | 1/2013 | Yasui | G03B 33/08 362/231 |
| 2013/0038941 A1* | 2/2013 | Pesach | G01B 11/25 359/619 |
| 2013/0335531 A1* | 12/2013 | Lee | G01B 11/25 348/46 |
| 2015/0070473 A1* | 3/2015 | Wang | G01B 11/2509 348/49 |
| 2015/0098092 A1* | 4/2015 | Wiedenmann | G01B 11/2509 356/603 |
| 2016/0156888 A1 | 6/2016 | Euler et al. | |
| 2016/0356596 A1 | 12/2016 | Kitamura | |
| 2017/0124715 A1* | 5/2017 | Tin | G06T 7/521 |
| 2018/0125338 A1* | 5/2018 | Pfeiffer | G01B 11/2513 |

FOREIGN PATENT DOCUMENTS

| | | |
|---|---|---|
| CN | 101194194 A | 6/2008 |
| CN | 202355396 U | 8/2012 |
| CN | 103040430 A | 4/2013 |
| CN | 104614925 A | 5/2015 |
| CN | 104634276 A | 5/2015 |
| CN | 104677308 A | 6/2015 |
| CN | 204479038 U | 7/2015 |
| CN | 105333838 A | 2/2016 |
| CN | 105662324 A | 6/2016 |
| CN | 106482663 A | 3/2017 |
| CN | 106580506 A | 4/2017 |
| CN | 206208788 U | 5/2017 |
| CN | 206488748 U | 9/2017 |
| CN | 108020173 A | 5/2018 |
| CN | 108269300 A | 7/2018 |
| CN | 109489583 A | 3/2019 |
| EP | 3202366 A1 | 8/2017 |
| JP | 2002048523 A | 2/2002 |
| JP | 2003279329 A | 10/2003 |
| JP | 2004341299 A | 12/2004 |
| JP | 3118839 U | 2/2006 |
| JP | 2006122335 A | 5/2006 |
| JP | 2009025189 A | 2/2009 |
| JP | 2010169572 A | 8/2010 |
| JP | 2011504230 A | 2/2011 |
| JP | 2014219404 A | 11/2014 |
| JP | 2016128785 A | 7/2016 |
| JP | 2016524149 A | 8/2016 |
| JP | 2017156311 A | 9/2017 |
| WO | 2013012054 A1 | 1/2013 |
| WO | 2017125926 A2 | 7/2017 |
| WO | 2018073824 A1 | 4/2018 |

OTHER PUBLICATIONS

The Second office action of family CA application No. 3, 120,413 issue on Jun. 7, 2023.
CN third search report issued May 14, 2021 re: Application No. 201811378663.1.
EP search report issued Dec. 15, 2021 re: Application No. 19888068.4.
Wang, Xiaowen. "Research of 3D Reconstruction Algorithm Based On Binocular Vision". China Master's Theses Full-text Database.
Chai, Xinghua. "Research on 3D Deformation Measurement Combining Digital Speckle Interference and Digital Image Correlation". China Master's Theses Full-text Database.
International Search Report for corresponding application PCT/CN2019/119446 filed Nov. 19, 2019; Mail date Feb. 1, 2020.
CN search reprot issued Feb. 14, 2020 re: Application No. 201811378663.1.
Takashi Miyoshi et al. "Development of Non-contact Profile Sensor for 3-D Free-form Surfaces (2nd Report)—Properties of Optical Ring Image Sensor". Dec. 1992. vol. 58, No. 12, pp. 2087-2092.

* cited by examiner

PROJECTION APPARATUS, COLLECTION APPARATUS, AND THREE-DIMENSIONAL SCANNING SYSTEM WITH SAME

The present application claims priority of Chinese Patent Application No. 201811378663.1, filed on Nov. 19, 2018, entitled "Projection Apparatus, Collection Apparatus, and Three-dimensional Scanning System with Same", the contents of which are hereby incorporated by reference in its entirety.

TECHNICAL FIELD

The present application relates to the field of three-dimensional scanning, and in particular to a projection apparatus, a collection apparatus, and a three-dimensional scanning system with the same.

BACKGROUND ART

In the existing technology, there are multiple methods for obtaining a three-dimensional shape of an object, specifically including: de-matching sinusoidal fringes based on time coding, performing three-dimensional reconstruction and splicing fusion, and then obtaining the three-dimensional shape of the object; obtaining the three-dimensional shape of the object through algorithms of extracting a fringe center line based on time coding and performing three-dimensional reconstruction and splicing fusion; or obtaining the three-dimensional shape of the object based on a microscopic confocal three-dimensional imaging principle.

However, the above methods for obtaining the three-dimensional shape of the object are not applicable to intra-oral three-dimensional scanning due to own defects as follows: the three-dimensional reconstruction method based on time coding cannot implement handheld scanning, so that a high-precision intra-oral scanning operation cannot be implemented. Moreover, the cost is high due to the support requirement of a high frame rate camera and a high-speed algorithm. The method based on the microscopic confocal three-dimensional imaging principle has high hardware processing cost.

At present, no effective solutions have been proposed for the problems that the method for obtaining the three-dimensional shape of an object in the related art is not applicable to an oral environment and is high in cost.

SUMMARY OF THE INVENTION

The present application provides a projection apparatus, a collection apparatus, and a three-dimensional scanning system with the same, and aims to solve the problems that a method for obtaining a three-dimensional shape of an object in the related art is not applicable to an oral environment and is high in cost.

According to another aspect of the present application, a projection apparatus is provided. The apparatus includes: a light emission portion, configured to emit multiple rays of preset light, the multiple rays of preset light correspond to multiple preset wavebands, and the multiple preset wavebands are different from each other; and a light transmission portion, disposed on a transmission path of the rays of preset light, the rays of preset light is transmitted via a preset pattern on the light transmission portion to generate target light projected to a target object in the form of color-coded fringes, and the light transmission portion transmits the rays of preset light corresponding to at least two different preset wavebands.

Optionally, when one light transmission portion is provided, the light transmission portion is disposed on the transmission path of the multiple rays of preset light sent by the light emission portion, and the light transmission portion is provided with multiple preset images. The target light is generated by transmitting the multiple rays of preset light via the multiple preset images, and each preset image corresponds to a different preset waveband.

Optionally, the projection apparatus further includes a light convergence portion, the light convergence portion is disposed on the transmission path of the multiple rays of preset light, and the multiple rays of preset light are projected to the light transmission portion in the same transmission path after being converged by the light convergence portion.

Optionally, the light emission portion further includes any one of the following: multiple LED light sources, the light emission portion emits the multiple rays of preset light through the multiple LED light sources; and multiple laser emitters, the light emission portion emits the multiple rays of preset light through the multiple laser emitters.

Optionally, when the light emission portion emits the multiple rays of preset light through the multiple laser emitters, the projection apparatus further includes a decoherence portion disposed on the transmission path of the rays of preset light, and the rays of preset light is projected to the light transmission portion after diffraction spots are eliminated through the decoherence portion.

Optionally, the decoherence portion includes: a phase modulation element, disposed on the transmission path of the rays of preset light and rotating around a preset axis, the transmission path of the rays of preset light is parallel to the preset axis of the phase modulation element; and a beam coupling element, disposed on the transmission path of the rays of preset light and configured to perform collimation adjustment on the rays of preset light and reduce a divergence angle of the rays of preset light. The decoherence portion eliminates the diffraction spots of the rays of preset light through the phase modulation element and the beam coupling element.

Optionally, when the light emission portion emits the multiple rays of preset light through the multiple laser emitters, the projection apparatus further includes a solid dielectric element disposed on the transmission path of the rays of preset light, and the rays of preset light is projected to the light transmission portion after being subjected to multiple reflection mixing by the solid dielectric element.

According to another aspect of the present application, a three-dimensional model collection apparatus is provided. The apparatus includes: an image collection portion, configured to collect multiple shadow images corresponding to a target object when the target object is projected by target light in the form of color-coded fringes. The color-coded fringes correspond to at least two preset wavebands; each shadow image corresponds to a different color segments; and the color segments and the preset wavebands are in one-to-one correspondence. The multiple shadow images include a projection pattern for generating a three-dimensional model of the target object.

Optionally, the image collection portion includes multiple color collection devices (CCDs), and collects the multiple shadow images through the multiple CCDs. The multiple CCDs and the multiple shadow images are in one-to-one correspondence.

According to another aspect of the present application, a three-dimensional scanning system is provided. The three-dimensional scanning system includes: a projection apparatus, the projection apparatus is any one of the projection apparatuses; and a three-dimensional model collection apparatus, the collection apparatus is any one of the collection apparatuses. The projection apparatus is configured to generate target light projected to a target object in the form of color-coded fringes; the three-dimensional model collection apparatus is configured to collect a projection pattern generated by projecting the target light to the target object; and the projection pattern is used for determining a three-dimensional model of the target object.

According to one aspect of the present application, a projection method is provided. The method includes: emitting multiple rays of preset light, the multiple rays of preset light correspond to multiple preset wavebands, and the multiple preset wavebands are different from each other; determining a preset pattern corresponding to each preset waveband, the preset patterns are different from each other; and transmitting the multiple rays of preset light according to the preset patterns to obtain target light, the target light are projected to a target object in the form of color-coded fringes.

According to one aspect of the present application, a three-dimensional model collection method is provided. The method includes: collecting multiple shadow images corresponding to a target object when the target object is projected by target light in the form of color-coded fringes. The color-coded fringes correspond to at least two preset wavebands; each shadow image corresponds to a different color segment; and the color segments and the preset wavebands are in one-to-one correspondence. The multiple shadow images include a projection pattern for generating a three-dimensional model of the target object.

According to one aspect of the present application, a three-dimensional scanning method is provided. The method includes: transmitting multiple rays of preset light according to corresponding preset patterns to obtain target light projected to a target object in the form of color-coded fringes, the multiple rays of preset light correspond to multiple different preset wavebands, and each preset pattern corresponds to a different preset waveband; collecting multiple shadow images corresponding to the target object when the target object is projected by the target light in the form of color-coded fringes, the color-coded fringes correspond to at least two preset wavebands, each shadow image corresponds to a different color segment, and the color segments and the preset wavebands are in one-to-one correspondence; and generating a three-dimensional model of the target object according to the projection pattern included in each shadow image.

According to another aspect of the present application, a storage medium is provided. The storage medium includes a stored program, and the program performs any one of the projection method, the three-dimensional model collection method, and the three-dimensional scanning method.

According to another aspect of the present application, a processor is provided. The processor is configured to run a program, and when the program running, any one of the projection method, the three-dimensional model collection method, and the three-dimensional scanning method is performed.

Through the present application, the light emission portion is adopted to emit multiple rays of preset light, where the multiple rays of preset light correspond to multiple preset wavebands, and the multiple preset wavebands are different from each other; and the light transmission portion is disposed on the transmission path of the rays of preset light, where the rays of preset light is transmitted via the preset pattern on the light transmission portion to generate the target light projected to the target object in the form of color-coded fringes, and the light transmission portion transmits the rays of preset light corresponding to at least two different preset wavebands. As such, the problems that the method for obtaining the three-dimensional shape of an object in the related art is not applicable to the oral environment and is high in cost are solved.

In this case, the projection apparatus also has the following features: 1, low hardware cost; and 2, apparatus miniaturization. Furthermore, the problems that the method for obtaining the three-dimensional shape of an object in the related art is not applicable to the oral environment and is high in cost are solved. An original projection system is a dynamic projection system. The projection apparatus provided by the embodiments of the present application is transmission projection, and the hardware cost of the projection apparatus is greatly reduced.

That is, multiple rays of preset light with different wavebands are transmitted through the light transmission portion to generate the target light projected to the target object in the form of color-coded fringes, so that the technical effect that the three-dimensional shape of the target object can be obtained based on the target light projected to the target object is achieved.

BRIEF DESCRIPTION OF THE DRAWINGS

The accompanying drawings constituting a part of the present application are used for providing further understanding for the present invention. Exemplary embodiments of the present application and descriptions thereof are used for explaining the present application and do not constitute any inappropriate limitation to the present application. In the drawings.

Figure 1:
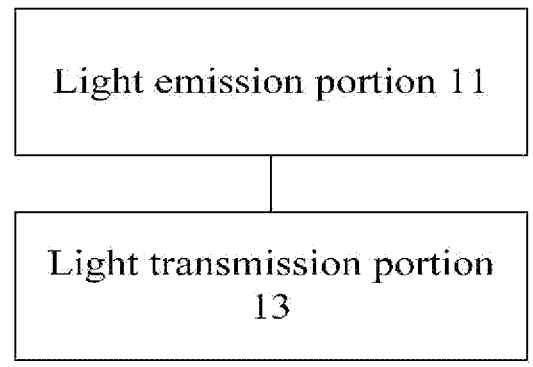
FIG. 1 is a schematic diagram of a projection apparatus according to an embodiment of the present application.

The drawings include the following reference signs:
21a, laser emitter; 21b, LED light source; 22, semi-reflecting and semi-transmitting spectroscope; 23, small motor; 24, phase modulation element; 25, beam coupling element; 26, solid dielectric element; 27, light transmission portion; 28, projection imaging lens; 29, reflector; 30, illumination unit; 31, collection imaging lens; 32, image collection portion.

DETAILED DESCRIPTION OF THE INVENTION

It should be stated that in the case of no conflict, embodiments in the present application and features in the embodiments can be mutually combined. The present application is described below in detail with reference to the drawings and in combination with the embodiments.

To make those skilled in the art better understand the solutions of the present application, the technical solutions in the embodiments of the present application will be clearly and completely described below with reference to the drawings in the embodiments of the present application. Obviously, the described embodiments are only a part of the embodiments of the present application, not all of the embodiments. All other embodiments obtained by those of ordinary skill in the art based on the embodiments of the present application without creative efforts should fall within the scope of protection of the present application.

It should be noted that the specification and claims of the present application and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present application described here are implemented. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

According to an embodiment of the present application, a projection apparatus is provided.

FIG. 1 is a schematic diagram of a projection apparatus according to an embodiment of the present application. As shown in FIG. 1, the projection apparatus includes: a light emission portion 11 and a light transmission portion 13.

The light emission portion 11 is configured to emit multiple rays of preset light; the multiple rays of preset light correspond to multiple preset wavebands, and the multiple preset wavebands are different from each other.

The light transmission portion 13 is disposed on a transmission path of the rays of preset light; the rays of preset light is transmitted via a preset pattern on the light transmission portion to generate target light projected to a target object in the form of color-coded fringes; and the light transmission portion transmits the rays of preset light corresponding to at least two different preset wavebands.

In an optional example, multiple rays of preset light need to be transmitted simultaneously to generate the target light by the light transmission portion.

In another optional example, the color-coded fringes are generated by coding using 2 to 3 preset color fringes, i.e., the target light projected in the form of color-coded fringes is generated by coding using 2 to 3 preset wavebands of fringe light.

With the projection apparatus provided by the embodiment of the present application, the light emission portion emits multiple rays of preset light; the multiple rays of preset light correspond to multiple preset wavebands; and the multiple preset wavebands are different from each other. The light transmission portion is disposed on the transmission path of the rays of preset light; the rays of preset light is transmitted via the preset pattern on the light transmission portion to generate the target light projected to the target object in the form of color-coded fringes; and the light transmission portion transmits the rays of preset light corresponding to at least two different preset wavebands. As such, the problems that a method for obtaining a three-dimensional shape of an object in the related art is not applicable to an oral environment and is high in cost are solved.

In this case, the projection apparatus also has the following features: 1, low hardware cost; and 2, apparatus miniaturization. Furthermore, the problems that the method for obtaining the three-dimensional shape of an object in the related art is not applicable to the oral environment and is high in cost are solved. An original projection system is a dynamic projection system. The projection apparatus provided by the embodiment of the present application is transmission projection, and the hardware cost of the projection apparatus is greatly reduced.

That is, multiple rays of preset light with different wavebands are transmitted through the light transmission portion to generate the target light projected to the target object in the form of color-coded fringes, so that the technical effect that the three-dimensional shape of the target object can be obtained based on the target light projected to the target object is achieved.

It should be noted that when the target light is projected to the target object in the form of color-coded fringes, an image collection apparatus collects multiple shadow images corresponding to the target object, and the shadow images include projection patterns generated by the target light. Further, a three-dimensional model of the target object may be generated based on the color-coded fringes in the projection patterns.

It should be emphasized that compared with a projection device for three-dimensional reconstruction based on time coding, the projection apparatus provided by the present application is lighter and simpler, and the technical target can be achieved only by the light transmission portion and the light emission portion; and compared with a projection device for three-dimensional reconstruction based on a microscopic confocal three-dimensional imaging principle, the projection apparatus provided by the present application is lower in cost, and the technical target can be achieved only by the light transmission portion and the light emission portion.

Optionally, in the projection apparatus provided by the embodiment of the present application, the light emission portion further includes any one of the following: multiple LED light sources, the light emission portion emitting the multiple rays of preset light through the multiple LED light sources; and multiple laser emitters, the light emission portion emitting the multiple rays of preset light through the multiple laser emitters.

That is, the light emission portion may be composed of multiple laser emitters or multiple LED light sources. When the light emission portion is composed of the multiple laser emitters, the multiple rays of preset light emitted by the light emission portion are laser light, and when the light emission portion is composed of the multiple LED light sources, the multiple rays of preset light emitted by the light emission portion are normal light. In addition, the LED light sources are monochromatic light sources.

It should be noted that when the light emission portion emits the multiple rays of preset light through the multiple laser emitters, the rays of preset light has the performance features of laser light, i.e., directional light emission, extremely high brightness, extremely pure color, and good coherence.

Optionally, in the projection apparatus provided by the embodiment of the present application, the projection apparatus further includes a light convergence portion disposed on the transmission path of the multiple rays of preset light. The multiple rays of preset light are projected to the light transmission portion in the same transmission path after being converged by the light convergence portion.

That is, when the transmission paths of the multiple rays of preset light emitted by the light emission portion are inconsistent, the projection apparatus provided by the embodiment of the present application further includes the light convergence portion. The light convergence portion is configured to converge the multiple rays of preset light with inconsistent transmission paths, so that the multiple rays of preset light are transmitted in the same transmission path.

Figure 2:
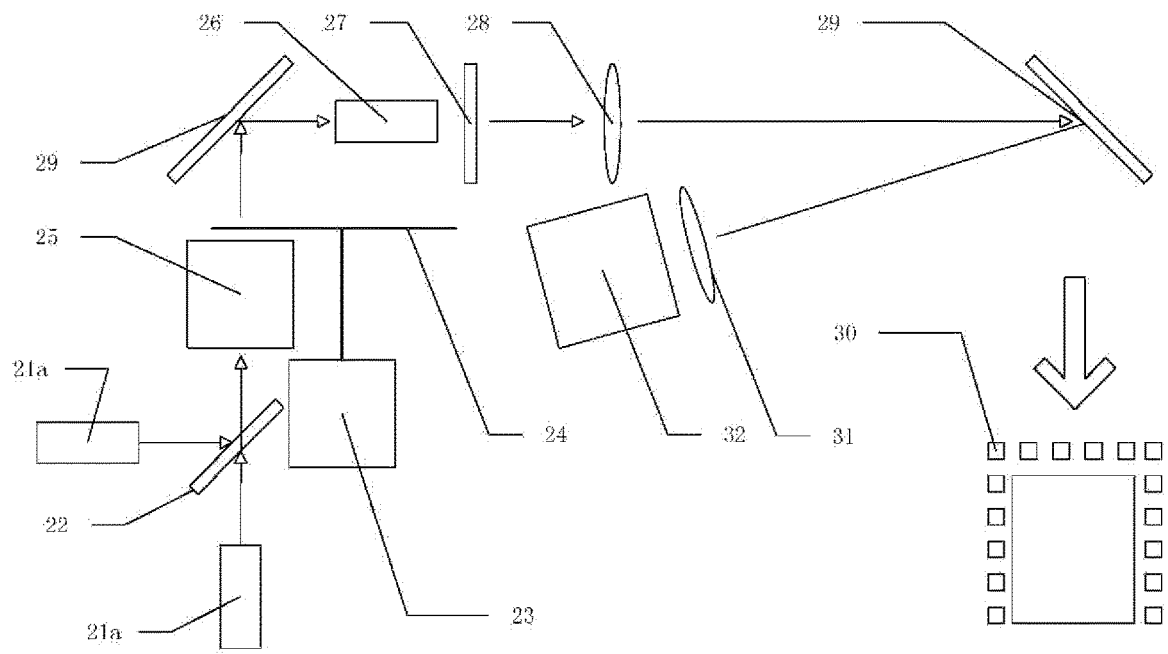
FIG. 2 is a schematic diagram I of an optional projection apparatus according to an embodiment of the present application.
Figure 3:
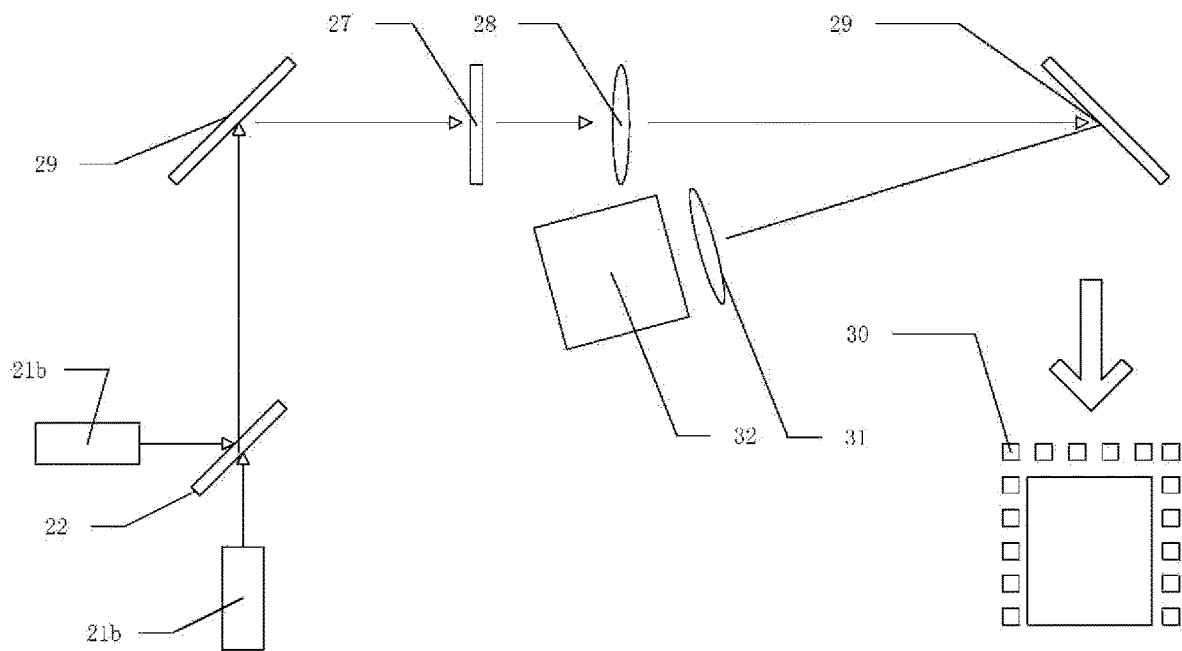
FIG. 3 is a schematic diagram II of an optional projection apparatus according to an embodiment of the present application.

In an optional embodiment, the light convergence portion is a semi-reflecting and semi-transmitting spectroscope. As shown in FIG. 2 and FIG. 3, a first laser emitter and a second laser emitter emit two rays of preset light simultaneously. The two rays of preset light are projected to two sides of the semi-reflecting and semi-transmitting spectroscope respectively; the rays of preset light emitted by the first laser emitter is reflected on the surface of the semi-reflecting and semi-transmitting spectroscope; and the rays of preset light emitted by the second laser emitter is refracted on the surface of the semi-reflecting and semi-transmitting spectroscope. In this case, the rays of preset light emitted by the first laser emitter and the rays of preset light emitted by the second laser emitter are transmitted in the same transmission path.

Optionally, in the projection apparatus provided by the embodiment of the present application, when the light emission portion emits the multiple rays of preset light through the multiple laser emitters, the projection apparatus further includes a decoherence portion disposed on the transmission path of the rays of preset light, the rays of preset light is projected to the light transmission portion after diffraction spots are eliminated through the decoherence portion.

That is, when the light emission portion emits the multiple rays of preset light through the multiple laser emitters, the projection apparatus provided by the embodiment of the present application is further provided with the decoherence portion on the transmission path of the rays of preset light. The decoherence portion is configured to eliminate the diffraction spots in the projection pattern caused by laser coherence.

In an optional embodiment, the decoherence portion provided by the embodiment of the present application includes: a phase modulation element, disposed on the transmission path of the rays of preset light and rotating around a preset axis, the transmission path of the rays of preset light is parallel to the preset axis of the phase modulation element; and a beam coupling element, disposed on the transmission path of the rays of preset light and configured to perform collimation adjustment on the rays of preset light and reduce a divergence angle of the rays of preset light. The decoherence portion eliminates the diffraction spots of the rays of preset light through the phase modulation element and the beam coupling element.

It should be noted that the phase modulation element may be a transparent optical material sheet or a random phase plate. When both an aperture and a divergence angle of a laser beam are small, the beam coupling element may be composed of a collimating system and a converging system. When the divergence angle of the laser beam is large, the beam coupling element is composed of multiple lens elements.

Optionally, in the projection apparatus provided by the embodiment of the present application, when the light emission portion emits the multiple rays of preset light through the multiple laser emitters, the projection apparatus further includes a solid dielectric element disposed on the transmission path of the rays of preset light, the rays of preset light is projected to the light transmission portion after being subjected to multiple reflection mixing by the solid dielectric element.

That is, when the light emission portion emits the multiple rays of preset light through the multiple laser emitters, the projection apparatus provided by the embodiment of the present application is further provided with the solid dielectric element on the transmission path of the rays of preset light. The solid dielectric element is configured to generate preset light with uniform light intensity and project the rays of preset light with uniform light intensity to the light transmission portion.

In an optional example, the solid dielectric element is in the form of any one of the following prisms: a slender hexahedral prism, a cylinder prism, and a cone prism. Meanwhile, the solid dielectric element may be a hollow rod in which the rays of preset light is repeatedly reflected in a space enclosed by a solid interface, and may also be a solid rod in which light is transmitted inside a solid transparent dielectric. Input end and output end faces of the solid rod are plated with anti-reflection films, and an inner surface of the hollow rod is plated with an anti-refraction film. In addition, an emergent end face of the solid dielectric element is parallel to an incident end face.

In conjunction with the decoherence portion and the solid dielectric element, in an optional example, the projection apparatus provided by the embodiment of the present application includes a decoherence uniform illumination system, that is, the decoherence uniform illumination system drives the phase modulation element to rotate around a rotating shaft at a certain speed through a small motor to implement real-time modulation on the phase of a laser beam; the modulated laser beam is projected to the solid dielectric element; the laser beam is subjected to multiple reflection mixing in the solid dielectric element; and a light field with uniform intensity is output finally.

Optionally, in the projection apparatus provided by the embodiment of the present application, when one light transmission portion is provided, the light transmission portion is disposed on the transmission path of the multiple rays of preset light sent by the light emission portion, and the light transmission portion is provided with multiple preset images. The target light is generated by transmitting the multiple rays of preset light via the multiple preset images, and each preset image corresponds to a different preset waveband.

That is, when one light transmission portion is provided, the projection apparatus provided by the embodiment of the present application is further provided with a light transmission portion on the transmission path of the multiple rays of preset light sent by the light emission portion. The light transmission portion is configured to selectively transmit the multiple rays of preset light with different wavebands, so as to form the target light projected in the form of preset coded fringes.

For example, the light transmission portion includes a color grating sheet; multiple preset images are disposed on the color grating sheet; and each preset image corresponds to a different color. In this case, the multiple preset images form color-coded fringes. Further, when the multiple rays of preset light are transmitted through the color grating sheet, the target light projected to the target object by the color-coded fringes is automatically generated.

Optionally, in the projection apparatus provided by the embodiment of the present application, the projection apparatus further includes multiple reflectors. The reflectors are disposed on the transmission path of the target light and/or the rays of preset light and are configured to change the transmission path of the target light and/or the rays of preset light.

That is, the multiple reflectors are disposed on the transmission path of the target light and/or the rays of preset light to change the transmission path of the target light and/or the rays of preset light, thereby achieving the technical effects of optimizing a light path in a three-dimensional scanning apparatus and reducing the volume of the three-dimensional scanning device.

Optionally, in the projection apparatus provided by the embodiment of the present application, the projection apparatus further includes multiple illumination units. The illumination units correspond to the target object, and the illumination units are configured to illuminate the target object, so that the background brightness of the target object is improved, the depth of field of the target object is increased, and the technical effect of conveniently collecting multiple shadow images corresponding to the target object is achieved.

In an optional example, the illumination units may be multiple three-color LED lamps.

In another optional example, as shown in FIG. 2 and FIG. 3, multiple illumination units are disposed at the outer periphery of a target reflector for changing the transmission path of the target light. Illumination light emitted by the illumination units is projected to the target object together with the target light reflected by the target reflector.

An embodiment of the present application also provides a three-dimensional model collection apparatus. It should be noted that a target object in the three-dimensional model collection apparatus according to the embodiment of the present application is the target object to which the target light generated by the projection apparatus provided by the embodiment of the present application is projected. The three-dimensional model collection apparatus provided by the embodiment of the present application will be introduced below.

Figure 4:
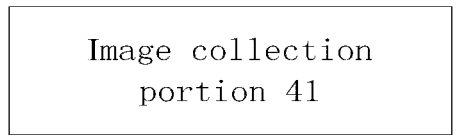
FIG. 4 is a schematic diagram of a three-dimensional model collection apparatus according to an embodiment of the present application.

FIG. 4 is a schematic diagram of a three-dimensional model collection apparatus according to an embodiment of the present application. As shown in FIG. 4, the apparatus includes an image collection portion 41.

The image collection portion 41 is configured to collect multiple shadow images corresponding to a target object when the target object is projected by target light in the form of color-coded fringes. The color-coded fringes correspond to at least two preset wavebands; each shadow image corresponds to a different color segment; and the color segments and the preset wavebands are in one-to-one correspondence. The multiple shadow images include a projection pattern for generating a three-dimensional model of the target object.

With the collection apparatus provided by the embodiment of the present application, the image collection portion collects the multiple shadow images corresponding to the target object when the target object is projected by the target light in the form of color-coded fringes. The color-coded fringes correspond to at least two preset wavebands; each shadow image corresponds to a different color segment; the color segments and the preset wavebands are in one-to-one correspondence; and the multiple shadow images include a projection pattern for generating a three-dimensional model of the target object. As such, the problems that a method for obtaining a three-dimensional shape of an object in the related art is not applicable to an oral environment and is high in cost are solved.

In this case, the target object is spatially coded based on the color-coded fringes of the target light, thereby achieving the technical purpose of three-dimensional reconstruction of the target object only with one frame of two-dimensional image, reducing the frame rate requirement of an image collection device, and reducing the operation cost of a subsequent algorithm. In addition, by using colors as basic elements of space coding, the technical effect of improving the identification accuracy is also achieved.

That is, the projection pattern formed by projecting the target light to the target object is collected when the target object is projected by the target light in the form of color-coded fringes, so that the technical effect that the three-dimensional shape of the target object can be obtained based on the projection pattern is achieved.

Optionally, in the three-dimensional model collection apparatus provided by the embodiment of the present application, the image collection portion includes multiple CCDs, and collects the multiple shadow images through the multiple CCDs. The multiple CCDs and the multiple shadow images are in one-to-one correspondence.

That is, the shadow images corresponding to the target object are collected through the multiple CCDs, thereby achieving the technical effect of accurately distinguishing colors.

It should be noted that each CCD collects only the shadow image of a corresponding color segment.

The above operation that the image collection portion collects the multiple shadow images through the multiple CCDs is illustrated as follows: a wavelength range corresponding to first preset light is 770-622 nm; a wavelength range corresponding to second preset light is 577-492 nm; and a wavelength range corresponding to third preset light is 455-435 nm. Three preset patterns are disposed on the light transmission portion; the three preset patterns overlap to form color-coded fringes; and the color-coded fringes are formed by sequentially coding and sorting red, green, and blue color fringes. In this case, after the first preset light, the second preset light, and the third preset light pass through the light transmission portion to form the target light projected to the target object in the form of color-coded fringes.

It should be noted that all the red fringes in the color-coded fringes correspond to a first preset pattern; all the green fringes in the color-coded fringes correspond to a second preset pattern; and all the blue fringes in the color-coded fringes correspond to a third preset pattern. Further, the first preset light is projected to the target object after being transmitted and filtered by the first preset pattern; the second preset light is projected to the target object after being transmitted and filtered by the second preset pattern; and the third preset light is projected to the target object after being transmitted and filtered by the third preset pattern. In this case, the first preset light, the second preset light, and the third preset light form the target light after being transmitted and filtered by the preset patterns.

Further, after being transmitted and filtered by the preset pattern, the first preset light is projected to the target object to form a red projection pattern. In this case, a red CCD collects a red shadow image on the target object. The red shadow image includes the red projection pattern formed by projecting the first preset light to the target object. CCDs of other colors work similarly, and will not be specifically explained herein.

An embodiment of the present application also provides a three-dimensional scanning system. It should be noted that the three-dimensional scanning system according to the embodiment of the present application includes the three-dimensional model collection apparatus provided by the embodiment of the present application and the projection apparatus provided by the embodiment of the present application. The three-dimensional scanning system provided by the embodiment of the present application will be introduced below.

Figure 5:
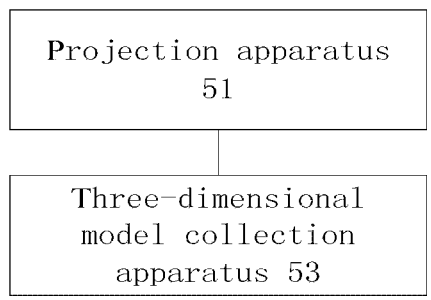
FIG. 5 is a schematic diagram of a three-dimensional scanning system according to an embodiment of the present application.

FIG. 5 is a schematic diagram of a three-dimensional scanning system according to an embodiment of the present application. As shown in FIG. 5, the apparatus includes a projection apparatus 51 and a three-dimensional model collection apparatus 53.

The projection apparatus 51 is any one projection apparatus provided in the embodiment of the present application.

The three-dimensional model collection apparatus 53 is any one collection apparatus provided in the embodiment of the present application.

It should be noted that the projection apparatus is configured to generate target light projected to a target object in the form of color-coded fringes; the three-dimensional model collection apparatus is configured to collect a projection pattern generated by projecting the target light to the target object; and the projection pattern is used for determining a three-dimensional model of the target object.

With the three-dimensional scanning system provided by the embodiment of the present application, the projection apparatus generates the target light projected to the target object in the form of color-coded fringes; the three-dimensional model collection apparatus collects the projection pattern generated by projecting the target light to the target object; and the projection pattern is used for determining the three-dimensional model of the target object. As such, the problems that a method for obtaining a three-dimensional shape of an object in the related art is not applicable to an oral environment and is high in cost are solved.

That is, the light transmission portion transmits multiple rays of preset light with different wavebands to generate target light projected to the target object in the form of color-coded fringes, and the projection pattern formed by projecting the target light to the target object is collected when the target object is projected by the target light in the form of color-coded fringes, so that the technical effect that the three-dimensional shape of the target object can be obtained based on the projection pattern is achieved.

Optionally, in the three-dimensional scanning system provided by the embodiment of the present application, the three-dimensional scanning system further includes an image processing portion, configured to obtain multiple shadow images corresponding to the target object, and generate a three-dimensional model of the target object according to projection patterns included in the multiple shadow images. The projection patterns included in the multiple shadow images are collected when the target object is projected by the target light in the form of color-coded fringes.

Optionally, in the three-dimensional scanning system provided by the embodiment of the present application, the three-dimensional scanning system further includes an image sending portion, configured to send the multiple shadow images collected by the image collection portion to the image processing portion.

The three-dimensional scanning system provided by the embodiment of the present application will be illustrated below in two cases where the light emission portion emits the multiple rays of preset light through the multiple laser emitters and the light emission portion emits the multiple rays of preset light through the multiple LED light sources:

As shown in FIG. 2, when the light emission portion emits the multiple rays of preset light through the multiple laser emitters, the three-dimensional scanning system provided by the embodiment of the present application solves the problems that a method for obtaining a three-dimensional shape of an object in the related art is not applicable to an oral environment and is high in cost through the following ways.

The projection apparatus performs quasi-convergence adjustment on the rays of preset light emitted by multiple (2-3) laser emitters with different wavebands in a transmission projection mode, transmits the multiple rays of adjusted preset light through a preset pattern of the light transmission portion to form the target light projected in the form of color-coded fringes, and finally projects the target light to the target object through an imaging lens.

It should be noted that due to the coherence of laser light, diffraction spots may occur in the resulting projection pattern, and a decoherence uniform illumination system is required to eliminate the diffraction spots occurring in the projection pattern. Specifically, the decoherence uniform illumination system drives a phase modulation element to rotate around a rotating shaft at a certain speed through a small motor to implement real-time modulation on the phase of a laser beam; the modulated laser beam is projected to the solid dielectric element; the laser beam is subjected to multiple reflection mixing in the solid dielectric element; and a light field with uniform intensity is output finally.

In this case, a time sequence control circuit triggers the projection apparatus to project the target light to the target object (tooth/gum) in the form of color-coded fringes, that is, multiple preset patterns on the light transmission portion are projected to the target object through the target light. Meanwhile, the image collection portion is controlled to rapidly obtain the shadow image of the target object. The shadow image includes the projection pattern generated by projecting the target light to the target object. Specifically, shadow images of different color segments are collected by using different CCDs in the image collection portion.

Finally, the shadow images of different color segments respectively obtained by different CCDs are transmitted to the image processing portion (a computer). In this case, the image processing portion performs data processing on the multiple obtained shadow images by using a software algorithm to obtain three-dimensional data of the target object. Specifically, the image processing portion distinguishes multiple colors (2-3 colors) through different shadow images obtained by different CCDs, identifies and matches a sequence of color-coded fringes in the projection patterns included in the multiple shadow images according to a coding body composed of the colors (2-3 colors) stored in advance, and then constructs the three-dimensional shape of the target object by using a three-dimensional reconstruction algorithm and a splicing fusion algorithm.

In summary, the three-dimensional scanning system provided by the embodiment of the present application achieves the technical effect of directly carrying out real-time dynamic three-dimensional scanning with color textures on materials with the characteristics of reflection, transmission, diffusion and the like of intra-oral teeth, gums and the like.

As shown in FIG. 3, when the light emission portion emits the multiple rays of preset light through the multiple LED light sources, the three-dimensional scanning system provided by the embodiment of the present application solves the problems that the method for obtaining the three-dimensional shape of an object in the related art is not applicable to the oral environment and is high in cost through the following ways.

The projection apparatus forms the target light projected in the form of color-coded fringes by preset light emitted by multiple (2-3) monochromatic LED light sources with different wavebands through a preset pattern of the light transmission portion in a transmission projection mode, and finally projects the target light to the target object through an imaging lens.

It should be noted that the wavebands corresponding to the monochromatic LED light sources do not overlap, so that the technical effects of accurately distinguishing the colors of the rays of preset light and reducing the interference among the colors are achieved.

In this case, a time sequence control circuit triggers the projection apparatus to project the target light to the target object (tooth/gum) in the form of color-coded fringes, that is, multiple preset patterns on the light transmission portion are projected to the target object through the target light. Meanwhile, the image collection portion is controlled to rapidly obtain the shadow image of the target object. The shadow image includes the projection pattern generated by projecting the target light to the target object. Specifically, shadow images of different color segments are collected by using different CCDs in the image collection portion.

Finally, the shadow images of different color segments respectively obtained by different CCDs are transmitted to the image processing portion (a computer). In this case, the image processing portion performs data processing on the multiple obtained shadow images by using a software algorithm to obtain three-dimensional data of the target object. Specifically, the image processing portion distinguishes multiple colors (2-3 colors) through different shadow images obtained by different CCDs, identifies and matches a sequence of color-coded fringes in the projection patterns included in the multiple shadow images according to a coding body composed of the colors (2-3 colors) stored in advance, and then constructs the three-dimensional shape of the target object by using a three-dimensional reconstruction algorithm and a splicing fusion algorithm.

In summary, the three-dimensional scanning system provided by the embodiment of the present application achieves the technical effect of directly carrying out real-time dynamic three-dimensional scanning with color textures on materials with the characteristics of reflection, transmission, diffusion and the like of intra-oral teeth, gums and the like.

It should be noted that the three-dimensional scanning system provided by the embodiment of the present application may further include a heat dissipation system and a heating anti-fog system. The heat dissipation system is configured to protect the projection apparatus and the collection apparatus, and the anti-fog system is configured to assist the collection apparatus to obtain the shadow images corresponding to the target object.

An embodiment of the present application also provides a projection method. It should be noted that the projection apparatus according to the embodiment of the present application may be configured to perform the projection method provided by the embodiment of the present application. The projection method provided by the embodiment of the present application will be introduced below.

Figure 6:
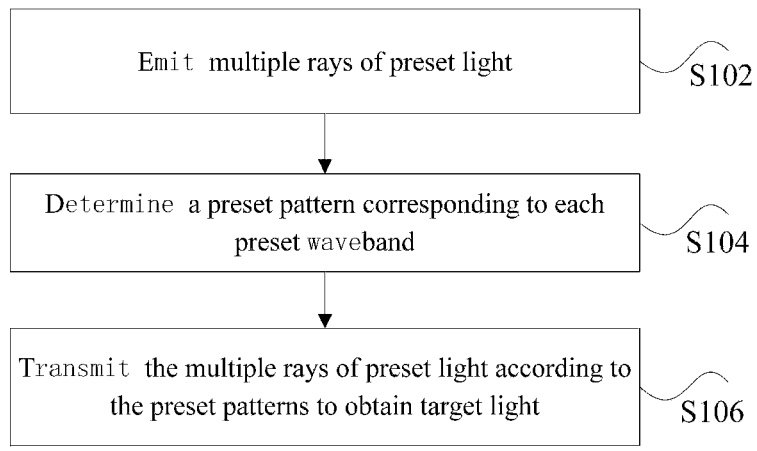
FIG. 6 is a flowchart of a projection method according to an embodiment of the present application.

FIG. 6 is a schematic diagram of a projection method according to an embodiment of the present application. As shown in FIG. 6, the method includes the following steps.

At step S102, multiple rays of preset light are emitted. The multiple rays of preset light correspond to multiple preset wavebands, and the multiple preset wavebands are different from each other.

At step S104, a preset pattern corresponding to each preset waveband is determined. The preset patterns are different from each other.

At step S106, the multiple rays of preset light are transmitted according to the preset patterns to obtain target light. The target light is projected to a target object in the form of color-coded fringes.

With the projection method provided by the embodiment of the present application, multiple rays of preset light are emitted, the multiple rays of preset light correspond to multiple preset wavebands, and the multiple preset wavebands are different from each other; a preset pattern corresponding to each preset waveband is determined, the preset patterns are different from each other, and the multiple rays of preset light are transmitted according to the preset patterns to obtain target light, the target light is projected to the target object in the form of color-coded fringes. As such, the problems that a method for obtaining a three-dimensional shape of an object in the related art is not applicable to an oral environment and is high in cost are solved.

That is, the multiple rays of preset light with different wavebands are transmitted through the light transmission portion to generate the target light projected to the target object in the form of color-coded fringes, so that the technical effect that the three-dimensional shape of the target object can be obtained based on the target light projected to the target object is achieved.

Optionally, in the projection method provided by the embodiment of the present application, before the multiple rays of preset light are transmitted according to the preset pattern to obtain the target light, the method further includes at least one of the following: converging the multiple rays of preset light; performing decoherence processing on the multiple rays of preset light when the rays of preset light is laser light; and performing mixing processing on the multiple rays of preset light when the rays of preset light is laser light.

An embodiment of the present application also provides a three-dimensional model collection method. It should be noted that the three-dimensional model collection apparatus according to the embodiment of the present application may be configured to perform the three-dimensional model collection method provided by the embodiment of the present application. The three-dimensional model collection method provided by the embodiment of the present application will be introduced below.

Figure 7:
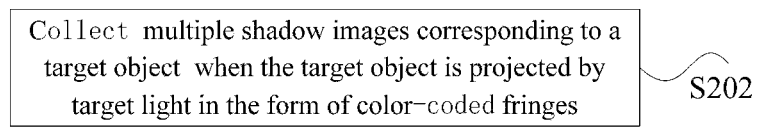
FIG. 7 is a flowchart of a three-dimensional model collection method according to an embodiment of the present application.

FIG. 7 is a schematic diagram of a three-dimensional model collection method according to an embodiment of the present application. As shown in FIG. 7, the method includes the following steps.

At step S202, multiple shadow images corresponding to a target object are collected when the target object is projected by target light in the form of color-coded fringes. The color-coded fringes correspond to at least two preset wavebands; each shadow image corresponds to a different color segment; and the color segments and the preset wavebands are in one-to-one correspondence.

The multiple shadow images include a projection pattern for generating a three-dimensional model of the target object.

With the three-dimensional model collection method provided by the embodiment of the present application, multiple shadow images corresponding to the target object are collected when the target object is projected by the target light in the form of color-coded fringes. The color-coded fringes correspond to at least two preset wavebands; each shadow image corresponds to a different color segment; the color segments and the preset wavebands are in one-to-one correspondence; and the multiple shadow images include the projection pattern for generating the three-dimensional model of the target object. As such, the problems that a method for obtaining a three-dimensional shape of an object in the related art is not applicable to an oral environment and is high in cost are solved.

That is, the projection pattern formed by projecting the target light to the target object is collected when the target object is projected by the target light in the form of color-coded fringes, so that the technical effect that the three-dimensional shape of the target object can be obtained based on the projection pattern is achieved.

Optionally, in the three-dimensional model collection method provided by the embodiment of the present application, the projection pattern included in each shadow image is generated by projecting different preset light to the target object, and the different preset light is light corresponding to different preset wavebands in the target light.

An embodiment of the present application also provides a three-dimensional scanning method. It should be noted that the three-dimensional scanning system according to the embodiment of the present application may be configured to perform the three-dimensional scanning method provided by the embodiment of the present application. The three-dimensional scanning method provided by the embodiment of the present application will be introduced below.

Figure 8:
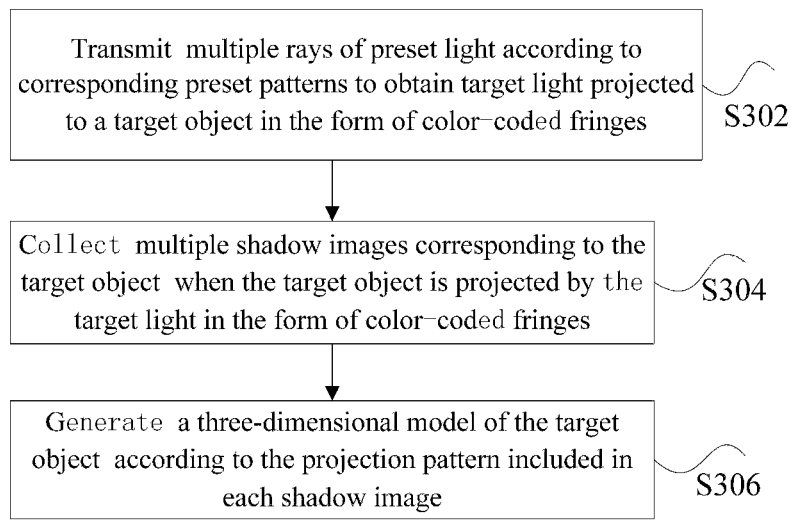
FIG. 8 is a flowchart of a three-dimensional scanning method according to an embodiment of the present application.

FIG. 8 is a schematic diagram of a three-dimensional scanning method according to an embodiment of the present application. As shown in FIG. 8, the method includes the following steps.

At step S302, multiple rays of preset light are transmitted according to corresponding preset patterns to obtain target light projected to a target object in the form of color-coded fringes. The multiple rays of preset light correspond to multiple different preset wavebands, and each preset pattern corresponds to a different preset waveband.

At step S304, multiple shadow images corresponding to the target object are collected when the target object is projected by target light in the form of color-coded fringes. The color-coded fringes correspond to at least two preset wavebands; each shadow image corresponds to a different color segments; and the color segments and the preset wavebands are in one-to-one correspondence.

At step S306, a three-dimensional model of the target object is generated according to the projection pattern included in each shadow image.

With the three-dimensional scanning method provided by the embodiment of the present application, the multiple rays of preset light are transmitted according to corresponding preset patterns to obtain the target light projected to the target object in the form of color-coded fringes, the multiple rays of preset light correspond to multiple different preset wavebands, and each preset pattern corresponds to a different preset waveband; multiple shadow images corresponding to the target object are collected when the target object is projected by THE target light in the form of color-coded fringes, the color-coded fringes correspond to at least two preset wavebands, each shadow image corresponds to a different color segment, and the color segments and the preset wavebands are in one-to-one correspondence; and the three-dimensional model of the target object is generated according to the projection pattern included in each shadow image. As such, the problems that a method for obtaining a three-dimensional shape of an object in the related art is not applicable to an oral environment and is high in cost are solved.

That is, the light transmission portion transmits the multiple rays of preset light with different wavebands to generate the target light projected to the target object in the form of color-coded fringes, and the projection pattern formed by projecting the target light to the target object is collected when the target object is projected by the target light in the form of color-coded fringes, so that the technical effect that the three-dimensional shape of the target object can be obtained based on the projection pattern is achieved.

Optionally, in the three-dimensional scanning method provided by the embodiment of the present application, the projection pattern included in each shadow image is generated by projecting different preset light to the target object, and the different preset light is light corresponding to different preset wavebands in the target light.

It should be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

An embodiment of the present invention provides a storage medium. The storage medium has a program stored thereon. When executed by a processor, the program implements any one of the projection method, the three-dimensional model collection method, and the three-dimensional scanning method.

An embodiment of the present invention provides a processor. The processor is configured to run a program, and when the program running, any one of the projection method, the three-dimensional model collection method, and the three-dimensional scanning method is performed.

An embodiment of the present invention provides a device. The device includes a processor, a memory, and a program stored on the memory and runnable on the processor. When executing the program, the processor implements the following steps.

Optionally, multiple rays of preset light are emitted, the multiple rays of preset light correspond to multiple preset wavebands, and the multiple preset wavebands are different from each other, a preset pattern corresponding to each preset waveband is determined, the preset patterns are different from each other; and the multiple rays of preset light are transmitted according to the preset patterns to obtain target light, the target light is projected to a target object in the form of color-coded fringes.

Optionally, multiple shadow images corresponding to the target object are collected when the target object is projected by the target light in the form of color-coded fringes. The color-coded fringes correspond to at least two preset wavebands; each shadow image corresponds to a different color segment; the color segments and the preset wavebands are in one-to-one correspondence; and the multiple shadow images include a projection pattern for generating a three-dimensional model of the target object.

Optionally, the multiple rays of preset light are transmitted according to corresponding preset patterns to obtain the target light projected to the target object in the form of color-coded fringes, the multiple rays of preset light correspond to multiple different preset wavebands, and each preset pattern corresponds to a different preset waveband; the multiple shadow images corresponding to the target object are collected when the target object is projected by the target light in the form of color-coded fringes, the color-coded fringes correspond to at least two preset wavebands, each shadow image corresponds to a different color segment, and the color segments and the preset wavebands are in one-to-one correspondence; and the three-dimensional model of the target object is generated according to the projection pattern included in each shadow image.

The device herein may be a server, a PC, a PAD, a mobile phone and the like.

An embodiment of the present application also provides a computer program product, which, when executed on a data processing device, is adapted to execute a program initialized with the following method steps:

Optionally, multiple rays of preset light are emitted, the multiple rays of preset light correspond to multiple preset wavebands, and the multiple preset wavebands are different from each other, a preset pattern corresponding to each preset waveband is determined, the preset patterns are different from each other; and the multiple rays of preset light are transmitted according to the preset patterns to obtain target light, the target light is projected to a target object in the form of color-coded fringes.

Optionally, multiple shadow images corresponding to the target object are collected when the target object is projected by the target light in the form of color-coded fringes. The color-coded fringes correspond to at least two preset wavebands; each shadow image corresponds to a different color segment; the color segments and the preset wavebands are in one-to-one correspondence; and the multiple shadow images include a projection pattern for generating a three-dimensional model of the target object.

Optionally, the multiple rays of preset light are transmitted according to corresponding preset patterns to obtain the target light projected to the target object in the form of color-coded fringes, the multiple rays of preset light correspond to multiple different preset wavebands, and each preset pattern corresponds to a different preset waveband; the multiple shadow images corresponding to the target object are collected when the target object is projected by the target light in the form of color-coded fringes, the color-coded fringes correspond to at least two preset wavebands, each shadow image corresponds to a different color segment, and the color segments and the preset wavebands are in one-to-one correspondence; and the three-dimensional model of the target object is generated according to the projection pattern included in each shadow image.

Those skilled in the art should understand that the embodiments of the present application may be provided as a method, a system, or a computer program product. Therefore, the present application may take the form of an entirely hardware embodiment, an entirely software embodiment, or an embodiment combining software and hardware. And the present application can be implemented in a form of a computer program product capable of being implemented on computer-available memory media (including but not limited to disk memory, CD-ROM, optical memory and the like) containing one or more computer-available program codes.

The present application is described with reference to flowcharts and/or block diagrams of methods, devices (systems), and computer program products according to the embodiments of the present application. It should be understood that computer program instructions can implement each flow and/or block in the flow chart and/or block diagram, or combinations of the flows and/or blocks in the flow chart and/or block diagram. These computer program instructions may be provided for a universal computer, a dedicated computer, an embedded processor or processors of other programmable data processing devices to generate a machine, such that an apparatus for implementing functions designated in one or more flows of the flowcharts and/or one or more blocks of the block diagrams is generated via instructions executed by the computers or the processors of the other programmable data processing devices.

These computer program instructions may also be stored in a computer-readable memory capable of guiding the computers or the other programmable data processing devices to work in a specific manner, such that a manufactured product including an instruction apparatus is generated via the instructions stored in the computer-readable memory, and the instruction apparatus implements the functions designated in one or more flows of the flowcharts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flowcharts and/or one or more blocks of the block diagrams.

In a typical configuration, a computing device includes one or more central processing units (CPUs), an input/output interface, a network interface, and a memory.

The memory may include a non-permanent memory, a random access memory (RAM), and/or a non-volatile memory in a computer-readable medium, such as a read only memory (ROM) or a flash RAM. The memory is an example of a computer-readable medium.

The computer-readable media include permanent and non-permanent, removable and non-removable media. Information can be stored in any way or by any technology. Information can be computer-readable instructions, data structures, modules of programs, or other data. The memory media of the computer include but not limited to phase-change random access memory (PRAM), static random access memory (SRAM), dynamic random access memory (DRAM), other types of random access memories (RAM), read-only memory (ROM), electrically erasable programmable read-only memory (EEPROM), flash memory or other memory technologies, compact disk-read only memory (CD-ROM), digital versatile disc (DVD) or other optical memories, cassette tape, tape and disk memory or other magnetic memories or any other non-transport media. The memory media can be used for storing the information which the computer can access. As defined herein, the computer-readable medium does not include computer-readable transitory media, such as modulated data signals and carrier waves.

Also it should be explained that terms "include", "comprise" or any other variations thereof herein are intended to contain non-exclusive inclusion, so that processes, methods, articles or device including a series of elements not only include those elements, but also include other elements which are not clearly listed, or also include inherent elements of the processes, methods, articles or device. The elements defined by a statement "include a . . . " shall not exclude the condition that other same elements also exist in the processes, methods, articles or device including the articles under the condition that no more restraints are required.

Those skilled in the art should understand that the embodiments of the present application may be provided as a method, a system or a computer program product. Therefore, the present application may take the form of an entirely hardware embodiment, an entirely software embodiment, or an embodiment combining software and hardware. And the present application can be implemented in a form of a computer program product capable of being implemented on computer-available memory media (including but not limited to disk memory, CD-ROM, optical memory and the like) containing one or more computer-available program codes.

The above are merely embodiments of the present application and are not intended to limit the present application. Various modifications and alterations of the present application will occur to those skilled in the art. Any modifications, equivalents, improvements and the like that come within the spirit and principles of the present application are intended to be within the scope of the claims appended hereto.

What is claimed is:

1. A projection apparatus, comprising:
   a light emission portion, configured to emit multiple rays of preset light, wherein the multiple rays of preset light correspond to multiple preset wavebands, and the multiple preset wavebands are different from each other; and
   a light transmission portion, disposed on a transmission path of the rays of preset light, wherein the rays of preset light is transmitted via a preset pattern on the light transmission portion to generate target light projected to a target object in the form of color-coded fringes, the target light is projected to the target object to obtain a sequence of color-coded fringes, and the light transmission portion transmits the rays of preset light corresponding to at least two different preset wavebands, the light transmission portion is provided with multiple preset images, multiple preset images generate the color-coded fringes, and each preset image corresponds to a different preset waveband, the color-coded fringes use colors as basic elements of space coding, a sequence of color-coded fringes in the projection patterns included in the multiple preset images are identified and matched according to a coding composed of multiple colors stored in advance, to obtain three-dimensional data of the target object.

2. The projection apparatus as claimed in claim 1, wherein when one light transmission portion is provided, the light transmission portion is disposed on the transmission path of the multiple rays of preset light sent by the light emission portion, and the light transmission portion is provided with multiple preset images, wherein the target light is generated by transmitting the multiple rays of preset light via the multiple preset images, and each preset image corresponds to a different preset waveband.

3. The projection apparatus as claimed in claim 1, further comprising: a light convergence portion, disposed on the transmission path of the multiple rays of preset light, wherein the multiple rays of preset light are projected to the light transmission portion in the same transmission path after being converged by the light convergence portion.

4. The projection apparatus as claimed in claim 1, wherein the light emission portion further comprises any one of the following:
   multiple LED light sources, the light emission portion emitting the multiple rays of preset light through the multiple LED light sources; and
   multiple laser emitters, the light emission portion emitting the multiple rays of preset light through the multiple laser emitters.

5. The projection apparatus as claimed in claim 4, wherein when the light emission portion emits the multiple rays of preset light through the multiple laser emitters, the projection apparatus further comprises a decoherence portion disposed on the transmission path of the rays of preset light, wherein the rays of preset light is projected to the light transmission portion after diffraction spots are eliminated through the decoherence portion.

6. The projection apparatus as claimed in claim 5, wherein the decoherence portion comprises:
   a phase modulation element, disposed on the transmission path of the rays of preset light and rotating around a preset axis, wherein the transmission path of the rays of preset light is parallel to the preset axis of the phase modulation element; and
   a beam coupling element, disposed on the transmission path of the rays of preset light and configured to perform collimation adjustment on the rays of preset light and reduce a divergence angle of the rays of preset light,
   wherein the decoherence portion eliminates the diffraction spots of the rays of preset light through the phase modulation element and the beam coupling element.

7. The projection apparatus as claimed in claim 4, wherein when the light emission portion emits the multiple rays of preset light through the multiple laser emitters, the projection apparatus further comprises a solid dielectric element disposed on the transmission path of the rays of preset light, wherein the rays of preset light is projected to the light transmission portion after being subjected to multiple reflection mixing by the solid dielectric element.

8. The projection apparatus as claimed in claim 1, comprising: an illumination unit, configured to illuminate the target object.

9. The projection apparatus as claimed in claim 8, comprising: reflectors, disposed on the transmission path of the target light and/or disposed on the rays of preset light.

10. The projection apparatus as claimed in claim 9, wherein the illumination unit is disposed at the outer periphery of the reflectors.

11. A three-dimensional model collection apparatus, comprising:
    an image collection portion, configured to collect multiple shadow images corresponding to a target object when the target object is projected by target light in the form of color-coded fringes, wherein the color-coded fringes correspond to at least two preset wavebands, each shadow image corresponds to a different color segment, and the color segments and the preset wavebands are in one-to-one correspondence, the target light is projected to the target object through a light transmission portion to obtain a sequence of color-coded fringes, the light transmission portion is provided with multiple preset images, multiple preset images generate the color-coded fringes, and each preset image corresponds to a different preset waveband;

wherein the multiple shadow images comprise a projection pattern for generating a three-dimensional model of the target object, the color-coded fringes use colors as basic elements of space coding, a sequence of color-coded fringes in the projection patterns included in the multiple preset images are identified and matched according to a coding composed of multiple colors stored in advance, to obtain three-dimensional data of the target object.

12. The three-dimensional model collection apparatus as claimed in claim 11, wherein the image collection portion comprises multiple color collection devices (CCDs), and collects the multiple shadow images through the multiple CCDs, and the multiple CCDs and the multiple shadow images are in one-to-one correspondence.

13. The three-dimensional model collection apparatus as claimed in claim 11, wherein the image collection portion comprises a collection imaging lens, arranged in the front of the collection apparatus.

14. A three-dimensional scanning system, comprising:
a projection apparatus; and
a three-dimensional model collection apparatus,
wherein the projection apparatus is configured to generate target light projected to a target object in the form of color-coded fringes, the three-dimensional model collection apparatus is configured to collect a projection pattern generated by projecting the target light to the target object, and the projection pattern is used for determining a three-dimensional model of the target object;

wherein the projection apparatus comprising: a light emission portion, configured to emit multiple rays of preset light, wherein the multiple rays of preset light correspond to multiple preset wavebands, and the multiple preset wavebands are different from each other; and a light transmission portion, disposed on a transmission path of the rays of preset light, wherein the rays of preset light is transmitted via a preset pattern on the light transmission portion to generate target light projected to a target object in the form of color-coded fringes, the target light is projected the target object to obtain a sequence of color-coded fringes, and the light transmission portion transmits the rays of preset light corresponding to at least two different preset wavebands, the light transmission portion is provided with multiple preset images, multiple preset images generate the color-coded fringes, and each preset image corresponds to a different preset waveband;

wherein the three-dimensional model collection apparatus comprising: an image collection portion, configured to collect multiple shadow images corresponding to the target object when the target object is projected by target light in the form of color-coded fringes, wherein the color-coded fringes correspond to at least two preset wavebands, each shadow image corresponds to a different color segment, and the color segments and the preset wavebands are in one-to-one correspondence;

an image processing portion, configured to identify and match a sequence of color-coded fringes in the projection patterns included in the multiple preset images according to a coding composed of multiple colors stored in advance, to obtain three-dimensional data of the target object, wherein the color-coded fringes use colors as basic elements of space coding.

15. The three-dimensional scanning system as claimed in claim 14, wherein the three-dimensional scanning system further comprises:
a time sequence control circuit, configured to trigger the projection apparatus to project the target light to the target object in the form of color-coded fringes, and control the collection apparatus to obtain the shadow image of the target object.

16. The three-dimensional scanning system as claimed in claim 14, wherein the three-dimensional scanning system further comprises:
a heat dissipation system, configured to protect the collection apparatus and the image collection portion.

17. The three-dimensional scanning system as claimed in claim 14, wherein the three-dimensional scanning system further comprises:
a heating anti-fog system, configured to assist the collection apparatus to obtain the shadow images corresponding to the target object.

18. A projection method, comprising:
emitting multiple rays of preset light, wherein the multiple rays of preset light correspond to multiple preset wavebands, the multiple preset wavebands are different from each other, and the color-coded fringes use colors as basic elements of space coding;
determining a preset pattern corresponding to each preset waveband, wherein the preset patterns are different from each other; and
transmitting the multiple rays of preset light according to the preset patterns to obtain target light, wherein the target light is projected to a target object in the form of color-coded fringes, the target light is projected to the target object to obtain a sequence of color-coded fringes, the sequence of color-coded fringes in the projection patterns included in the multiple preset images are identified and matched according to a coding composed of multiple colors stored in advance, to obtain three-dimensional data of the target object.

* * * * *